UNITED STATES PATENT OFFICE 2,678,887

HYDRATION RESISTANT CALCIUM OXIDE REFRACTORIES

Augustus J. Hathaway III, Youngstown, N. Y., assignor to National Lead Company, New York, N. Y., a corporation of New Jersey No Drawing. Application December 10, 1951, Serial No. 260,946

8 Claims. (Cl. 106—57)

This invention relates to refractory compositions and articles and is particularly concerned with such compositions and articles which contain large percentages of calcium oxide.

It is an object of the present invention to provide compositions containing large percentages of calcium oxide which are highly resistant to hydration.

Another object of the invention is to provide refractory bodies having compositions containing large amounts of calcium oxide which are non-porous and highly resistant to hydration.

A further object of the invention is to provide refractories of the character described which may be formed and fired by techniques and under conditions commonly used in the ceramic industry.

Still another object of the invention is to provide refractories of the character described which are resistant to attack by reactive molten metals.

A further object of the invention is to provide refractories of the dolomitic type which may be substituted for magnesite refractories.

Other objects and advantages of the invention will be apparent from the following specification.

Calcium oxide refractories have properties which make them valuable for a number of uses. Their use has, hitherto, been limited, however, by their strong tendency to hydrate in the presence of moisture. In many instances hydration of calcium oxide refractory bodies is accompanied by sufficient expansion as to cause the substantially complete disintegration of the bodies. The difficulties encountered in sintering high lime refractories to minimize their porosity has also discouraged their use.

It has now been discovered that refractories which contain large percentages of calcium oxide but which, nevertheless, have excellent resistance to hydration may be produced by adding to the calcium oxide lesser amounts of titanium oxide and zirconium oxide. Although sintering temperatures in excess of 4000° F. must be employed in sintering pure lime to render it non-porous, refractory bodies that are substantially non-porous and are highly resistant to hydration can be formed from mixtures of 90–95 per cent CaO and a total of 5–10 per cent $TiO_2$ and $ZrO_2$ by firing at temperatures of 3100°–3200° F. With mixtures in which smaller percentages of calcium oxide are used even lower firing temperatures may be employed.

Example 1

The excellent resistance to hydration of high lime compositions containing small amounts of both zirconia and titania was demonstrated by atmospheric exposure tests.

Mixes were made which when fired would give the following compositions:

| Composition No. | Percent by weight | | |
|---|---|---|---|
| | CaO | $TiO_2$ | $ZrO_2$ |
| 1 | 100 | | |
| 2 | 89 | 11 | |
| 3 | 90 | | 10 |
| 4 | 90 | 3 | 7 |

These mixes were compacted under a pressure of 10,000 p. s. i. to form blocks and fired for one hour at a temperature of 3100°–3150° F. The resultant blocks were then collectively exposed to the atmosphere to observe the progress of hydration.

Only the blocks formed from Composition No. 4 appeared to be permanently resistant to hydration by atmospheric moisture, these blocks showing no gain in weight over an exposure period of 23 weeks. The blocks formed from the other compositions were completely disintegrated in a comparatively short time and showed weight increases of up to 30 per cent in two weeks.

Example 2

In another, more severe, test for resistance to hydration, a number of mixes were made which on firing had the following compositions:

| Composition No. | Percent by weight | | |
|---|---|---|---|
| | CaO | $TiO_2$ | $ZrO_2$ |
| 1 | 90 | 4 | 6 |
| 2 | 90 | 3 | 7 |
| 3 | 85 | 6 | 9 |
| 4 | 80 | 8 | 12 |
| 5 | 70 | 5 | 25 |
| 6 | 70 | 12 | 18 |
| 7 | 70 | 20 | 10 |
| 8 | 60 | 16 | 24 |
| 9 | 50 | 20 | 30 |

These mixes were pressed into blocks at a pressure of 10,000 p. s. i. and fired in a gas furnace at a temperature of 3100°–3150° F. Their resistance to hydration was determined by keeping them immersed in water. After immersion for 24 hours all of the specimens showed less than 0.5 per cent loss in weight.

Similar blocks containing CaO and up to 40 per cent $TiO_2$ alone were substantially completely disintegrated in less than 16 hours of water immersion.

Crucibles formed of compositions including $TiO_2$ and $ZrO_2$ with CaO are exceptionally useful in fusing metals of high melting point such as titanium, zirconium and the like. These metals are extremely reactive when liquid and tend to attack the fusion crucibles. The problem of contamination from the container used for their fusion is therefore an important one and much effort has been devoted to attempts to find a refractory which the molten metals would not dissolve or react with. Calcium oxide has been found to resist attack by the fused metals but suitable crucibles of calcium oxide have been difficult to make both because of the tendency of the oxide to hydrate and because of the high temperatures needed to obtain a well sintered, non-porous body. From the following examples it will be seen that $CaO$-$TiO_2$-$ZrO_2$ refractories according to the present application are quite suitable for use in fusing reactive metals with high melting points even when the CaO content is substantially below 100 per cent.

Example 3

Several crucibles were formed of a refractory mix according to the present invention having the ultimate composition, by weight: CaO—80 per cent, $TiO_2$—8 per cent, $ZrO_2$—12 per cent. The green crucibles were fired to a non-porous condition in a gas furnace for periods of from one to three hours at temperatures of 3000°–3100° F. Subsequently, titanium metal was placed in the crucibles, heated under vacuum to its melting point, and then held in molten condition for several minutes before allowing it to freeze in the crucibles. After cooling, the crucibles were examined and it was found that they had not been attacked or penetrated by the molten metal. Analysis of the fused titanium ingots from the crucibles verified the finding that the refractories were not attacked as it was determined that the fusion resulted in no increase in the oxygen content of the metal.

Example 4

The experiment described in Example 3 was repeated using crucibles of even lower CaO content. The second batch of crucibles were formed by ramming from a refractory mix and were fired for one hour at a temperature of approximately 3050° F. Their ultimate composition by weight was: CaO—39 per cent, $TiO_2$—24 per cent, $ZrO_2$—37 per cent. Titanium metal was also fused in these crucibles under vacuum and allowed to freeze in the crucibles. The crucibles were not attacked and by analysis the average oxygen pickup by the metal during melting was found to be less than 0.03 per cent.

Crucibles of the compositions of the present invention may also, of course, be used for many other refractory purposes, such for example as the fusion of phosphate melts.

Dolomite, a widely occurring mineral composed of a mixture of calcium carbonate and magnesium carbonate, is a common, cheap material which would find extensive use as a raw material for refractories if it were not for tendency of the CaO, resulting from burning the dolomite, to hydrate. Unexpectedly, it has been found that the present invention is also applicable to prevent such hydration even in dolomitic refractories with a high magnesium content.

Example 5

A number of mixes were made with dolomite, the mixes on firing having the following compositions:

| Composition No. | Percent by weight | | | | |
|---|---|---|---|---|---|
| | CaO | MgO | $TiO_2$ | $ZrO_2$ | Other |
| 1 | 57.0 | 41.5 | | | 1.5 |
| 2 | 51.0 | 37.5 | 3.0 | 6.5 | 2.0 |
| 3 | 40.0 | 29.0 | 8.5 | 20.0 | 2.5 |

Portions of these mixes were pressed into blocks at a pressure of 10,000 p. s. i. and fired for 1 hour at 3000° F.

The resistance to hydration of the blocks thus obtained was determined by keeping them immersed in water. After immersion for 24 hours it was found that blocks formed from Composition No. 1 had completely disintegrated. Blocks formed from Composition No. 2 and Composition No. 3 were not, however, visibly affected by the test. When weighed after the test, No. 2 blocks were found to have a loss in weight of only 1.4 per cent while No. 3 blocks showed no loss in weight.

X-ray analyses of the fired compositions showed no evidence of the presence of any magnesium compound except periclase (MgO) and it may therefore be assumed that the magnesia is unaffected by the presence of the $TiO_2$ and $ZrO_2$ which inhibit hydration of the calcium oxide.

Hydration resistant dolomitic type refractories have great potential usefulness for many industrial applications such as in basic furnace bottoms for the ferrous metal industry. In many cases they can replace refractories formed from imported magnesite with considerable savings in cost.

The novel and valuable properties of refractories according to the present invention may be utilized to advantage in a number of different ways. Thus, as described above, crucibles for melting reactive metals may be formed of the refractories, as may also bricks and other refractory bodies of various shapes. Rammed monolithic linings for hearths, crucibles and furnaces may likewise be formed from these novel refractories.

In forming large refractory bodies and monolithic refractory linings from the novel compositions disclosed herein the use of pre-shrunk, substantially non-porous grog will often be found desirable to minimize the shrinkage of the refractory on firing or heating to operating temperatures. Such grog may be made in accordance with usual practice from mixes of widely varying $CaO$—$TiO_2$—$ZrO_2$ compositions. It has been found that under suitable conditions satisfactory refractories may be produced from such crushed grog of a single composition, from a mixture of crushed grogs of different compositions, and from a mixture of crushed grog with additional calcium oxide.

By reducing grog of the type mentioned above to finely divided form there is obtained a novel product containing a high percentage of calcium oxide which may be useful as a source of lime for various purposes where resistance to hydration is important, for example, as an ingredient in welding rod coatings.

In preparing mixes for products according to the present invention, it is possible to use either the pure metal oxides or materials which when fired are converted to the oxides. Thus, calcium carbonate, either natural or precipitated, calcium hydroxide, calcium nitrate and many other materials, including, when magnesia content is unobjectionable, dolomite, may be used as a source of CaO. The $ZrO_2$ may be provided, for example, by baddeleyite zirconium sulfate, zirconium hydroxide or calcium zirconate. Similarly, rutile, calcium titanate, titanium sulfate and the like may be used to supply the $TiO_2$. When using, as a source of CaO, a raw material which is likely to hydrate during the manufacture of the product it may be found desirable to temper the mix by coating the particles with a material such as stearic acid, ethyl cellulose or other hydrophobic material applied in a suitable organic solvent. Such tempering may also be employed when using a crushed pre-fired grog. Any fine particles of grog which contain insufficient $TiO_2$ and $ZrO_2$ to inhibit hydration of the CaO present will thereby be protected.

It will be understood that for many purposes substantial amounts of impurities may be tolerated in refractory and other compositions according to the present invention. For example, as pointed out above, for certain uses dolomite which contains large amounts of magnesium carbonate with calcium carbonate may be used instead of pure calcium carbonate as a source of CaO. Many other impurities such as those ordinarily found in the raw materials used may also be present. As might be expected, the presence of impurities not infrequently lowers the firing temperature required to obtain a well sintered, non-porous product. Consequently, where quite pure raw materials are used it may be necessary to increase somewhat the temperature and/or time of firing to obtain results equivalent to those obtained with less pure materials. Even with rather pure raw materials, however, it has been found possible to obtain non-porous, well sintered products with firing times of from one to three hours and temperatures between about 3000° and 3200° F. depending upon the composition. With large articles a somewhat longer time may, of course, be required. Obviously it is important that the impurities present should not be, per se, harmful in the intended use of the product and that they are not easily hydrated.

As will be observed from the foregoing description, the range of proportions of CaO, $TiO_2$ and $ZrO_2$ in the novel compositions of the present invention may be widely varied and the invention is considered to include such compositions in which the CaO content ranges from about 50 mol per cent to about 98 mol per cent and the $TiO_2$ and $ZrO_2$ contents each range from about 1 mol per cent to about 25 mol per cent. Since somewhat greater resistance to hydration is found with compositions having more than the minimum proportions of $TiO_2$ and $ZrO_2$ mentioned above, products having compositions in which the CaO, $TiO_2$ and $ZrO_2$ contents are within the approximate ranges of 40 to 90 weight per cent CaO, 3 to 4 weight per cent $TiO_2$ and 7 to 36 weight per cent $ZrO_2$ are preferred for some purposes. The proportion of $TiO_2$ to $ZrO_2$ may vary widely in hydration resistant compositions according to the invention, but excellent results have been obtained with the use of approximately equal mol percentages.

In forming crucibles and other refractory articles and bodies, in accordance with the present invention, conventional or other known procedures may be used in shaping the bodies. It will be realized, however, that if the mix contains calcium oxide, as such, hydration of the calcium oxide prior to firing of the article should be minimized by providing a hydrophobic coating on the particles or by other means. The firing or sintering of bodies, including grog, made according to the invention may be carried out in any suitable furnace or muffle.

I claim:

1. A fired refractory body having high resistance to hydration and a composition of from 50 to 98 mol per cent CaO, 1 to 25 mol per cent $TiO_2$, and 1 to 25 mol per cent $ZrO_2$.

2. A fired refractory body having high resistance to hydration and a composition, by weight, of from 40 to 90 per cent CaO, 3 to 24 per cent $TiO_2$, and 7 to 36 per cent $ZrO_2$.

3. A fired refractory body having high resistance to hydration and attack by molten metals and a composition, by weight, of from 39 to 80 per cent CaO, 8 to 24 per cent $TiO_2$, and 12 to 37 per cent $ZrO_2$.

4. A rammed refractory body having when fired high resistance to hydration and a composition of from 50 to 98 mol per cent CaO, 1 to 25 mol per cent $TiO_2$, and 1 to 25 mol per cent $ZrO_2$.

5. A refractory mix containing a pre-fired, hydration-resistant grog having a composition of from 50 to 98 mol per cent CaO, 1 to 25 mol per cent $TiO_2$, and 1 to 25 mol per cent $ZrO_2$.

6. A mix for forming hydration-resistant refractory bodies which has when fired a composition of from 50 to 98 mol per cent CaO, 1 to 25 mol per cent $TiO_2$, and 1 to 25 mol per cent $ZrO_2$.

7. A fired calcium oxide composition having high resistance to hydration and a composition of from 50 to 98 mol per cent CaO, 1 to 25 mol per cent $TiO_2$, and 1 to 25 mol per cent $ZrO_2$.

8. A fired dolomitic refractory having high resistance to hydration and a composition comprising MgO, CaO, $TiO_2$ and $ZrO_2$, said refractory, exclusive of said MgO and incidental impurities, having a composition of from 50 to 98 mol per cent CaO, 1 to 25 mol per cent $TiO_2$, and 1 to 25 mol per cent $ZrO_2$.

References Cited in the file of this patent

UNITED STATES PATENTS

| Number | Name | Date |
|---|---|---|
| 2,402,516 | Wainer | June 18, 1946 |
| 2,402,517 | Wainer | June 18, 1946 |
| 2,452,532 | Wainer | Oct. 26, 1948 |